Figure 1:
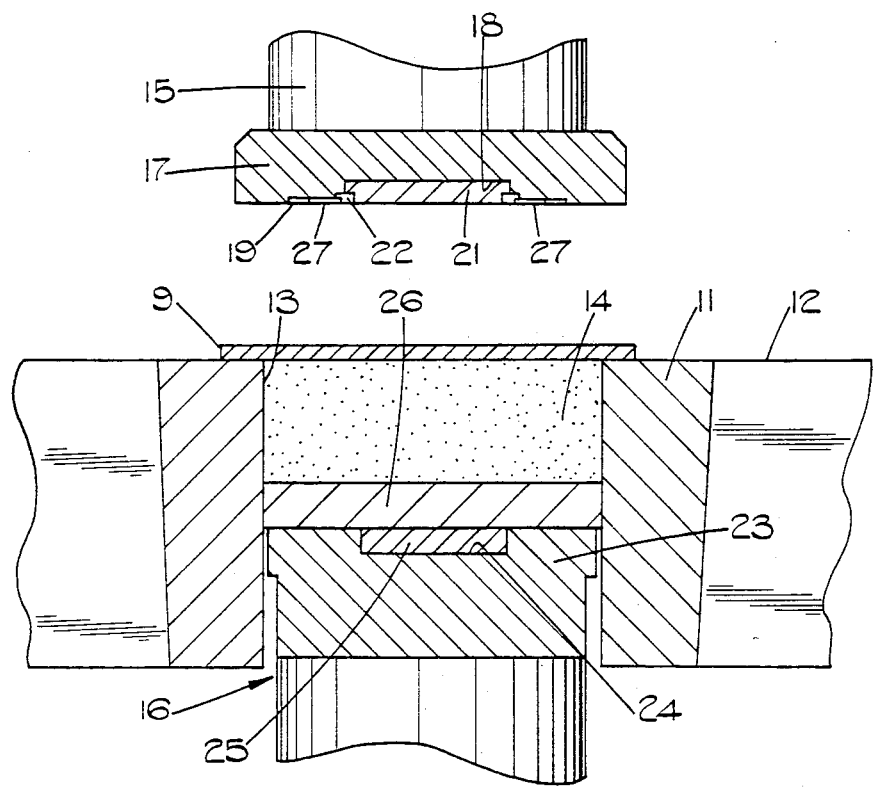

United States Patent [19]

Ward

[11] Patent Number: 4,576,872
[45] Date of Patent: Mar. 18, 1986

[54] FRICTION ELEMENT AND METHOD OF MANUFACTURE THEREOF

[75] Inventor: Melvyn Ward, Redditch, Great Britain

[73] Assignee: Lucas Industries, Birmingham, England

[21] Appl. No.: 581,320

[22] Filed: Feb. 17, 1984

[30] Foreign Application Priority Data

Feb. 24, 1983 [GB] United Kingdom ............... 8305189

[51] Int. Cl.⁴ ............................ B22F 3/14; B22F 3/16
[52] U.S. Cl. .................................. 428/550; 428/553; 419/2; 419/8
[58] Field of Search ................ 419/8, 2; 428/550, 553

[56] References Cited

U.S. PATENT DOCUMENTS 3,946,192  3/1976  Allen et al. ............................. 419/8
4,456,578  6/1984  Ward ...................................... 419/8

FOREIGN PATENT DOCUMENTS 1575906  11/1970  Fed. Rep. of Germany .......... 419/8
2054335   3/1972  Fed. Rep. of Germany .......... 419/8
55-107702 8/1980  Japan ..................................... 419/8
584440    7/1943  United Kingdom .
807909    6/1959  United Kingdom .
830322    3/1960  United Kingdom .
944578   12/1963  United Kingdom .
990620    4/1965  United Kingdom .
1114698   5/1968  United Kingdom .

Primary Examiner—Allan M. Lieberman

[57] ABSTRACT

To produce a sintered metal type brake friction element which beds-in quickly and which has a "feel" similar to a resin-based element, powdered metallic friction material is subjected to a resistance sintering or furnace sintering operation, so as to produce a sintered substrate and an unsintered or partly sintered surface layer which has less wear resistance than the substrate but friction properties which are not substantially less than the substrate. The surface layer may be formed of the same or different material as the substrate layer depending upon the sintering technique chosen.

11 Claims, 11 Drawing Figures

FRICTION ELEMENT AND METHOD OF MANUFACTURE THEREOF

This invention relates to a friction element for a brake, and is particularly, but not exclusively, concerned with a friction element produced using techniques including those disclosed in British Patent Specification No. 2106823A.

It is a disadvantage of friction elements for brakes that the full braking potential of the element is not obtained until the element has worn down to a sufficient extent that it is fully bedded-in, i.e. its friction surface has adopted the shape of the surface of the rotating element against which it operates to effect braking. This problem is particularly prevalent with sintered friction pads which are relatively hard and so do not bed in quickly, with the result that the full braking potential is not realised for quite some time after the element has been in use.

It is the usual practice to grind flat the normally irregular and uneven surface of the as-sintered friction pads in order to increase the initial contact area with the mating friction surface. However, since the surface is relatively hard and the specific loading is low, adequate bedding of the friction material can still take a considerable time (typically 300 km). If the pads are not ground, the presence of surface irregularities and uneveness causes a high specific loading on a low contact area, which may produce high initial wear. However, as a result of this high initial and localised wear, rapid work hardening of the pad can soon reduce the wear rate and bedding can be delayed by comparison with a ground surface. Tests have shown that this is particularly the case with friction pads which have been resistance sintered because such a sintering operation causes a natural inward curvature of the surface.

In addition, particularly with friction pads for motor cycles, riders often comment that friction pads lack "feel" compared to more conventional resin-based friction materials.

It is believed to be theoretically possible to improve bedding, without recourse to grinding, by increasing the inherent wear rate of the friction material, for example by reducing its mechanical strength. However, significant improvements in the bedding in rate necessitate the use of an undesirably thick pad if the normal pad life is to be retained.

It is disclosed in Japanese Patent Application (Laid Open) Publication No. 56-94037 that oxidation of alloy pads can be effected in order to overcome the initial difficulty in achieving full braking effect. However, the provision of an oxide layer requires a further processing step to be effected on the alloy friction element (copper-based) and also suffers from the problem that a dark red oxide skin is produced which is of poor appearance, dirty to handle, and leads to the development of rust. It is also proposed in the above mentioned Japanese Patent Application (Laid-open) Publication No. 56-94037 to overcome such problems by removing part of the oxide layer so as to leave an oxide-modified layer on the surface of the friction element. However, this procedure requires a still further operation on the friction element, with the result that the manufacturing costs are further increased.

It is an object of the present invention to provide a friction element and a method of manufacture thereof which can enable the above disadvantages to be obviated or mitigated.

More specifically, it is an object of the present invention to provide a sintered friction element which is capable of bedding more rapidly than a conventional ground sintered friction element whilst avoiding the need for any surface processing further to the sintering operation, thus benefitting both user and manufacturer.

According to one aspect of the present invention, there is provided a friction element comprising a sintered, metallic friction material substrate and a metallic friction material surface layer, said surface layer (a) defining a friction surface of the element, (b) having less wear resistance than the substrate, and (c) having friction properties which are not substantially less than those of the substrate, wherein the friction material surface layer is unsintered or only partially sintered over substantially the whole friction surface.

We have found that the mechanical strength of these sinterable friction materials is directly affected by the degree of sintering of such materials and mutatis mutandis that mechanically weak friction materials quickly bed-in in service.

Friction materials of the type used in the present invention typically comprise (1) sinterable metal (e.g. copper) particles with the optional inclusion of one or more alloying metal (e.g. tin) particles, and (2) friction modifiers such as abrasive (e.g. alumina, mica) particles and lubricants (e.g. coarse graphite, fine graphite).

To reduce manufacturing costs the surface layer is preferably formed at the time when the substrate is sintered.

The surface layer may be an unsintered or partly sintered portion of the same material which forms the sintered substrate.

Alternatively, the surface layer may be an unsintered or partly sintered layer formed of a different material which is unsinterable or less easy to sinter than that of the substrate under the sintering conditions so that, during sintering of the substrate, the material forming the surface layer remains unsintered or only partly sintered.

As a still further alternative, the surface layer may be formed of substantially the same ingredients as the material used to form the substrate but with at least one of the ingredients in a different physical form which renders the material of the surface layer more resistant to sintering than the substrate material at the chosen sintering conditions. For example, the friction modifier(s) may be in a more finely divided form in the surface layer than in the substrate. Typically, the surface layer has a thickness of up to about 2 mm, preferably about 0.5 to 2 mm thick. The substrate may be formed of more than one sintered layer if desired.

According to a second aspect of the present invention, there is provided a method of manufacturing a friction element, comprising the steps of shaping a powdered metallic friction material, and heating the shape to a sintering temperature so as to produce a friction element having a sintered metallic friction material substrate and an unsintered or only partially sintered friction material surface layer which (a) defines a friction surface of the friction element (b) has less wear resistance than the substrate, and (c) has friction properties which are not substantially less than those of the substrate.

The shaping and heating steps may comprise providing at least one layer of sinterable powdered metallic friction material in a die, and sintering the material under pressure in the die to form the sintered substrate and the surface layer.

Sintering is preferably effected by a resistance sintering operation. Depending upon the materials chosen, the resistance sintering operation may be effected with a metal electrode in direct contact with the material or with a so-called "sub-electrode" which is formed of an electrically conductive material having a lower thermal and electrical conductivity than the metal electrode. The sub-electrode is conveniently formed of graphite.

To produce the required structure in the friction element using a resistance sintering operation, a number of techniques may be employed to ensure that the surface layer remains unsintered or is only partially sintered:

1. Resistance sintering may be effected using a sub-electrode with the surface layer material being formulated to be unsinterable or only partially sintered under the sintering conditions necessary to sinter the substrate material(s).

2. Resistance sintering may be effected without a sub-electrode so that the metal electrode in contact with the material in the die produces a chill effect so that a portion of the material in contact with the electrode remains unsintered or is only partially sintered whilst the remainder of the same material is completely sintered.

3. Resistance sintering without a sub-electrode using a surface layer material which is formulated to be unsinterable or only partially sintered under the sintering conditions necessary to sinter the substrate material(s).

Alternatively, the friction element may be produced by furnace sintering a preform containing a surface layer material which is unsintered or only partially sintered under the furnace sintering conditions used to sinter the substrate material layer(s).

Of the above, technique 3 is preferred.

Assessment of whether complete, partial or no sintering has occurrred is most conveniently performed by microscopic examination. In an unsintered metallic friction material, there is no or minimal contact between the metal particles which are to a large extent separated from one another by the non-metallic ingredients (friction modifiers). In the case where the material contains an alloying ingredient, there is minimal alloying in the unsintered material.

In a partially sintered material of this type, there is a larger degree of interparticle contact with more extensive alloying if an alloying ingredient is present, and sintered contacts between particles are observed.

In a fully sintered material, the original metal particles are barely discernable, the non-metallic ingredients are dispersed in a metallic matrix, and very extensive alloying is present if an alloying ingredient is present.

Apart from microscopic examination, a guide to the degree of sintering is given by an examination of the density of the material. Measurement of the final density and comparison of this with the initial density of the material to express densification as a percentage ($\Delta\rho\%$) for resistance sintering gives an indication as to the degree of sintering which has taken place upon heating according to the formula.

$$\text{Densification } \Delta\rho \% = \frac{\rho\text{final} - \rho\text{initial}}{\rho\text{initial}} \times 100$$

where
$\rho$ final = the density of the material after pressing and heating, and
$\rho$initial = the density of the material after pressing but before heating.

Figure 4:
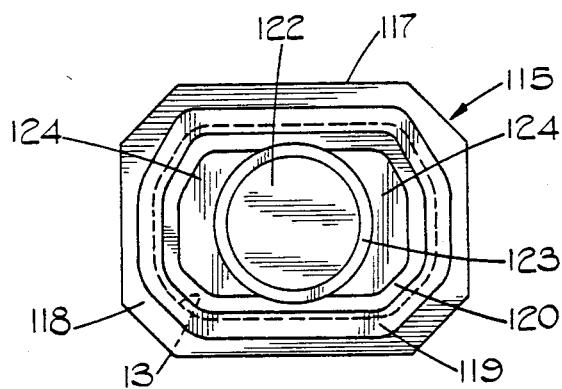
Figure 5:
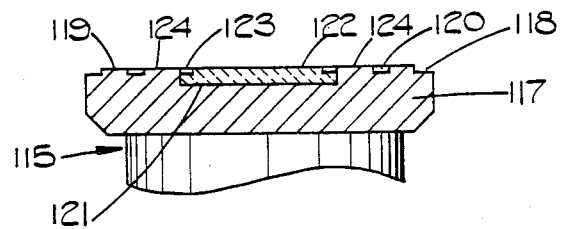
Figure 6:
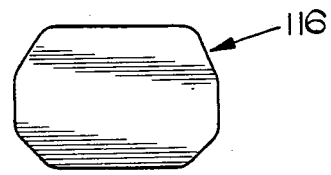
Figure 7:
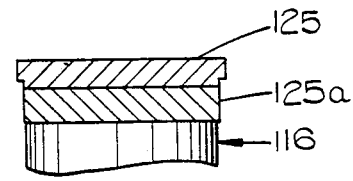
Figure 8:
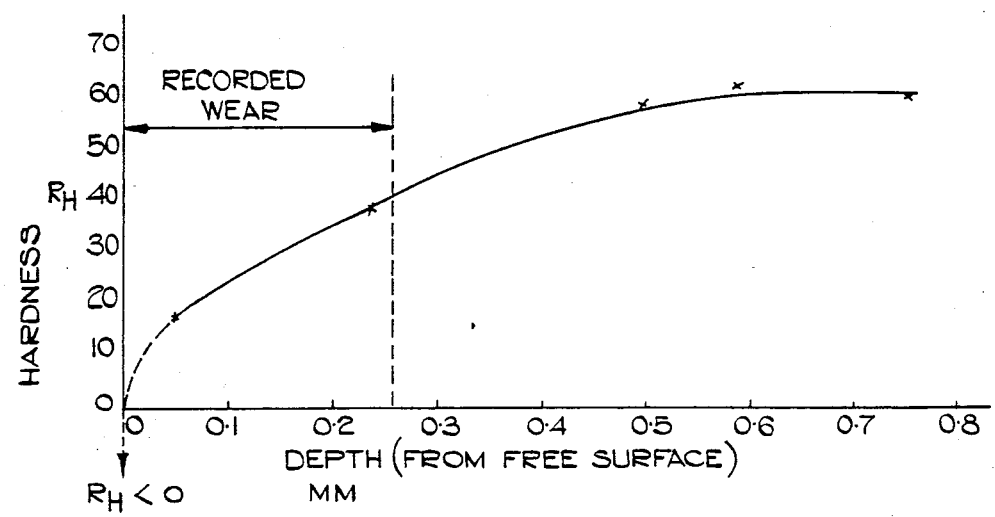
Figure 9:
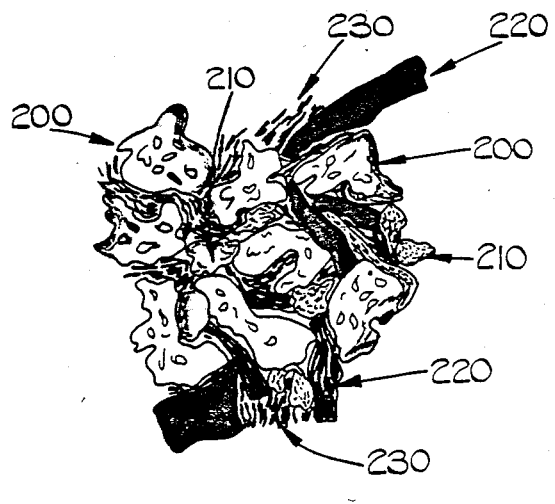
Figure 10:
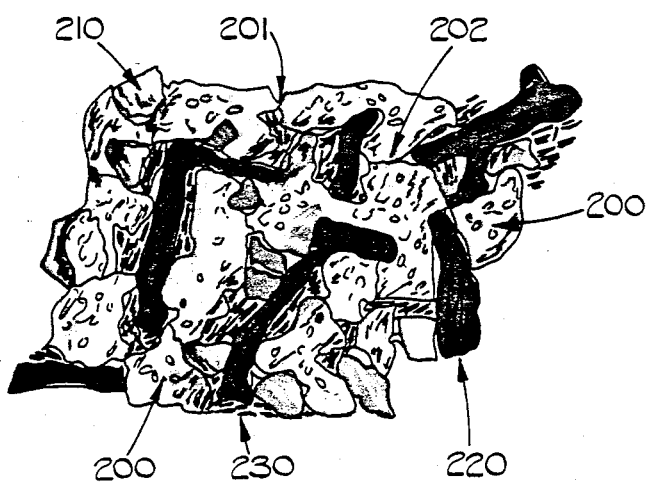
Figure 11:

In the accompanying drawings:
FIG. 1 is a cross-section through apparatus for manufacturing a friction element according to the present invention by means of a resistance sintering operation under pressure in a die,
FIG. 2 is a plan view of an upper electrode forming part of the apparatus of FIG. 1,
FIG. 3 is a plan view of a lower electrode forming part of the apparatus of FIG. 1,
FIGS. 4 and 5 are plan and sectional views through an alternative form of upper electrode for use in the apparatus of FIG. 1,
FIGS. 6 and 7 are plan and sectional views through an alternative form of lower electrode for use in the apparatus of FIG. 1,
FIG. 8 is a graph showing test results obtained in Example 5 described hereinafter, and
FIGS. 9 to 11 are sketches illustrating the appearance of unsintered, partially sintered and fully sintered metallic friction materials, respectively, under microscopic examination.

Figure 2:
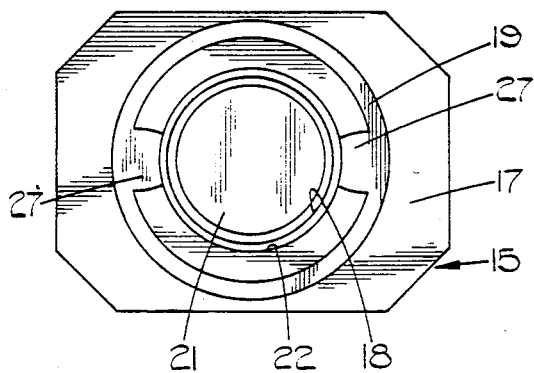
Figure 3:
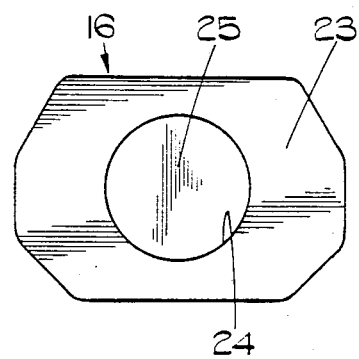

Referring to FIGS. 1 to 3 the apparatus comprises a die 11 formed of hot pressed silicon nitride, or more preferably, an open-sintered ceramic material containing at least 90% of a silicon aluminium oxynitride obeying the general formula:

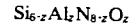

where z is greater than 0 and less than or equal to 5. The die 11 is conveniently produced in segments which are retained as a taper interference fit in an outer water jacket 12 so as to define a generally rectangular die cavity 13 which conforms to the shape of the required friction pad.

At one end, which in practice would define the top of the die, the die 11 is provided with a flat and smooth surface finish such that an oversize backing plate 9 can be used to seal said one end of the die cavity 13. The die 11 floats on springs (not shown) or air cylinders (also not shown) so that, in use, when a charge of a powdered friction material 14 is received in the die cavity 13, a force can be applied to the backing plate 9 by a first electrode 15 to urge the backing plate and the die towards a second electrode 16 received in the die cavity. The powdered friction material 14 is thereby compressed against the backing plate 9 so that, by passing an electric current between the electrodes 15, 16, the friction material can be sintered into the required friction pad and the pad bonded to the backing plate 9.

As shown in FIGS. 1 and 2, the first electrode 15 is formed of Cu-W alloy (MATTHEY 10W3-resistivity = 5 microohm.cm). A working tip 17 of the electrode 15 has a free end surface having a centrally disposed circular recess 18 (diameter 28 mm) in which a graphite insert 21 (FORDATH EC3—resistivity = 1680 microohm.cm) is an interference fit. The electrode 15 has an inner annular groove 22 defined partly by a shallow recessed portion around the periphery of the recess 18 and partly by a recessed portion around the periphery of the insert 21. The groove 22 has a width of 3 mm, a depth of 1 mm and an inner diameter of 24 mm. The free end surface of the tip 17 also has an outer annular groove 19 having a width of 3 mm, a depth of 0.5 mm and an inner diamter of 40 mm. The grooves 19 and 22 are interconnected at diametrically opposed locations on the long axis of the free end surface of the tip 17 by a pair of part circular slots 27 of 10 mm diameter and 0.5 mm depth. Apart from the grooves 19 and 22 and the slots 27, the free end surface of the tip 17 is machined so as to be flat and smooth. The insert 21 terminates short of the free end surface of the tip 17 by a distance of about 0.1 mm (not shown).

The ratio of the resistance of the insert 21 to the resistance of a corresponding length of the remainder of the electrode tip was of the order of 800:1.

As shown in FIGS. 1 and 3, the second electrode 16 includes a working tip 23, which in this embodiment, is formed of Cu-W alloy sold by Johnson Matthey as type 10W3. At its free end surface (i.e. the surface presented to the friction material), the tip 23 is planar and smooth apart from a centrally disposed, circular recess 24 which in this embodiment has a depth of 3.5 mm and a diameter of 24 mm. Mounted as an interference fit in, and completely filling, the recess 24 is a graphite insert 25 which, in this embodiment, is formed of the same Fordath material as the insert 21. In this embodiment, the ratio of the resistance of the insert 25 to the resistance of an equal length of the remainder of the electrode tip 23 is of the order of 1000:1. The electrode tip 23 is of the same generally rectangular cross section as the required pad and is stepped inwardly by about 0.5 mm at a short distance (3 mm in this embodiment) from its free end so as to avoid wedging of the electrode 16 and the die 11 as a result of non-release of flash produced in previous resistance sintering operations.

As shown in FIG. 1 the apparatus also includes a sub-electrode 26 which is mounted in the die cavity 13 on the free end surface of the second electrode tip 23, but is formed separately from the tip 23. The sub-electrode 26 conforms to the shape of the die cavity 13 and in this embodiment is formed of a 4 mm thick block of Fordath EC3 graphite.

The precise resistance of the sub-electrode 26 is not found to be critical. However, from a practical point of view, the preferred resistance lies in the range 5–50 microhms.

The examples of Fordath graphite used herein have the following resistance characteristics:

| Grade | Thickness (mm) | Resistance (microhm). |
|-------|----------------|-----------------------|
| EC3   | 4              | 36                    |
|       | 2.8            | 25                    |
| EC6   | 4              | 23                    |
|       | 3              | 17                    |

The sub-electrode can generate a temperature gradient within the mixture being sintered such that the temperature is high at the sub-electrode face and decreases towards the first electrode. However, it has been found that variations in the microstructure caused by this effect does not affect the frictional properties of the sintered material. In the following Examples 1 to 7 and Comparison Example 1, all testing was carried out using a scale dynamometer. In Comparison Examples 1 and Examples 1 to 6, the area of the friction surface was approximately 374 mm$^2$ whilst, in the case of Example 7, the area was approximately 248 mm$^2$. These areas are very much smaller than typical full size friction pads (area for example 1840 mm$^2$). Bedding or wear problems generally become more serious with increasing wear area. Therefore, it is to be expected that small improvements obtained with dynamometer samples would prove to be more significant when translated to full size components.

Wear of sintered friction materials is a very complex phenomenon and the actual rate of wear is likely to vary as the nature of the surface changes according to use. Therefore, the relative bedding behaviour has been indicated, not by any attempt to measure wear rates as such, but by maximum wear on the thickness at a fixed stage of testing. Measurement of maximum wear in this way gives a better indication of how a friction pad having an irregular surface will bed than by measurement of the rate of wear as such. In the relevant part of the wear test, samples are first subjected to 100 (bedding) stops at constant duty followed by several performance stages of varying duty. Wear is measured at this stage. The coefficients of friction quoted in the examples represent the stable level achieved during bedding, generally after 20 stops.

The extent of the initial rapid wear is limited, inter alia, by the thickness of the surface layer and by hardening of the layer as a result of hot working. In practice, the thickness of the layer is chosen to suit the requirements of the particular application. However, in the examples, the layer thicknesses achieved were generally sufficient to ensure that appropriate material could be retained on the surface during prolonged performance testing. In the materials used in the examples, there was not a sharp uniform transition between the surface layer and the substrate, but rather an irregular transition zone. By ensuring that the surface and the substrate have a similar coefficient of friction, no undesirable change in performance will be noticed by the user as the pad wears from the surface layer through the transitional layer to the substrate.

In Examples 8 to 10 and Comparison Examples 2 and 3 maximum wear was assessed after a short motor cycle test using full sized friction pads.

During the motor cycle test, 10 braking operations from 70–30 mph were performed.

The invention will be more particularly described with reference to the following practical Examples and Comparison Examples.

In the Example below, the powdered metallic friction materials used have compositions, as set out below:

|  | w/o | v/o |  | w/o | v/o |
|---|---|---|---|---|---|
| MB14 | | | MB34 | | |
| Cu | 70.0 | 48.9 | Cu | 69.0 | 48.9 |
| Sn | 9.1 | 7.8 | Sn | 9.0 | 7.8 |
| Pb | 3.0 | 1.6 | Pb | 2.9 | 1.6 |
| C | 8.5 | 23.1 (1) | C | 8.4 | 23.1 (1) |
| SiO$_2$ | 1.0 | 2.4 | SiO$_2$ | 1.0 | 2.4 |
| Si$_3$N$_4$ | 8.3 | 16.2 | Al$_2$O$_3$ | 9.7 | 16.2 (4) |
| Total Metal - | | 58.3 v/o | Total Metal - | | 58.3 v/o |
| Low mp Metal - | | 9.4 v/o | Low mp Metal - | | 9.4 v/o |
| MB42 | | | MB15 | | |
| Cu | 69.0 | 49.1 | Cu | 69 | 48.9 |
| Sn | 9.0 | 7.8 | Sn | 9 | 7.8 |
| C | 8.7 | 24.0 (1) | Pb | 2.9 | 1.6 |
| SiO$_2$ | 1.0 | 2.4 | C | 8.4 | 23.1 (1) |
| Al$_2$O$_3$ | 10.0 | 16.7 (4) | SiO$_2$ | 1 | 2.4 |
| | | | Al$_2$O$_3$ | 9.7 | 16.2 (3) |
| Total Metal - | | 56.9 v/o | Total Metal - | | 58.3 v/o |
| Low mp Metal - | | 7.8 v/o | Low mp Metal - | | 9.4 v/o |
| MB52 | | | MB48 | | |
| Cu | 78.1 | 56.7 | Cu | 43.2 | 30 |
| Pb | 2.8 | 1.6 | Fe | 33.9 | 26.7 (5) |
| C | 8.2 | 23.1 (1) | Pb | 2.9 | 1.6 |

-continued

|  | w/o | v/o |  | w/o | v/o |
|---|---|---|---|---|---|
| Al₂O₃ | 10.9 | 18.6 (3) | C | 8.6 | 23.1 (1) |
|  |  |  | Al₂O₃ | 11.4 | 18.6 (4) |
| Total Metal - |  | 58.3 v/o | Total Metal - |  | 58.3 v/o |
| Low mp Metal - |  | 1.6 v/o | Low mp Metal - |  | 1.6 v/o |

|  | MB12(a) |  |  | MB35 |  |
|---|---|---|---|---|---|
| Cu | 44 | 26.3 | Cu | 36.6 | 20 |
| Sn | 2.1 | 1.5 | Cr | 3 | 2 |
| Ni | 25.6 | 15.4 | Fe | 22.6 | 14 |
| TiO₂ | 1.0 | 1.3 | C | 16 | 34 (2) |
| C | 15.0 | 34.8 (1) | Mica | 4.6 | 8 |
| SiO₂ | 1.1 | 2.2 | Al₂O₃ | 17.1 | 22 (3) |
| Si₃N₄ | 11.0 | 18.4 |  |  |  |
| Total Metal - |  | 51.2 v/o | Total Metal - |  | 36 v/o |
| Low mp Metal - |  | 1.5 v/o | Low mp Metal - |  | 0 |

|  | MB41 |  |  | MB53 |  |
|---|---|---|---|---|---|
| Cu | 59.2 | 40.1 | Cu | 71 | 49.5 |
| Sn | 6 | 5 | Sn | 4 | 3.4 |
| Fe | 13 | 10 | Fe | 5 | 4 |
| C | 7.6 | 19.9 (1) | C | 7 | 18.9 (2) |
| Mica | 4.7 | 10.1 | Mica | 5 | 11 |
| Al₂O₃ | 9.4 | 14.9 (4) | Al₂O₃ | 8 | 13 (4) |
| Total Metal - |  | 55.1 v/o | Total Metal - |  | 56.9 v/o |
| Low mp Metal - |  | 5 v/o | Low mp Metal - |  | 3.5 v/o |

|  | MB58 |  |
|---|---|---|
| Cu | 69 | 49.1 |
| Sn | 9 | 7.8 |
| C | 8.7 | 24 (2) |
| SiO₂ | 1 | 2.4 |
| Al₂O₃ | 10 | 16.7 (4) |
| Total Metal - |  | 56.9 v/o |
| Low mp Metal - |  | 7.8 v/o |

[Notes in the above compositions:-
(1) = coarse, synthetic - Lonza KS 150/600 - less than 500 micrometers.
(2) = fine, natural - Woodstock AF 95/97
(3) = coarse calcined
(4) = fine reactive
(5) = steel fiber
mp = melting point]

COMPARISON EXAMPLE 1

A 4.5 mm thick mild steel backing plate 9 was initially degreased and then subjected to a dry gritting or shot blasting operation. The plate was then washed by dipping in water and then cleaned in a 5% hydrochloric acid solution for 1–2 minutes before being subjected to a further water dip. Thereafter, the plate was electroless nickel plated at 85° C. for 2–3 minutes using a IMASA 4181 as the electrolyte. After removal from the electrolyte, the plate was washed for approximately 1 minute in water and dried. If it was necessary to store the plate before subsequent processing, storage was effected in a sealed environment containing a dessicant.

5 g of composition MB 12a were evenly disposed in the base of the die cavity 13 (having a cross-sectional area of 1840 mm²) on top of the sub-electrode 26. The cavity was then filled with composition MB14. Said one end of the die cavity was then closed by the nickel-coated backing plate and the first electrode 15 was then urged against the backing plate with an applied pressure of 800 p.s.i. (5520 KPa) thereby to compress the friction material between the backing plate 9 and the electrode 16 and sub-electrode 26. Simultaneously, a current of $27 \times 10^3$A was passed between the electrodes from a 300 KVA 3-phase d.c. supply to sinter the friction material. The current and pressure were maintained for 8.8 seconds during which time the current rose to a maximum value of $34 \times 10^3$A. Passage of current was then terminated and the assembly allowed to cool under pressure. The resultant friction element was bonded to the plate 9 and was found to have a thickness of 5.2 mm and an overall density of 4.9 gcm$^{-3}$.

Further, the resultant friction element had a friction surface defined by a material formed from the powdered composition disposed in the base of the die cavity, the material forming a layer contiguous with the substrate but having a different composition.

The results are given in Table 1 below.

EXAMPLE 1

In this Example, the apparatus of FIGS. 1 to 3 was employed but without using the sub-electrode 26. Instead, the tip 23 of the second electrode 16 was dusted with fine graphite powder to prevent material sticking thereto. The die cavity 13 was charged by sweep filling to a depth of 4 mm with composition MB41. The die cavity was then sweep filled at a total depth of 13 mm with substrate material which, in this Example, was composition MB52.

Sintering of the two layers of material was effected for a total time of 7 seconds. However, in this example, a first pressure of 800 p.s.i. (5520 KPa) was maintained for 5 seconds after which a second pressure of 2200 p.s.i. (15180 KPa) was applied for the remaining two seconds of sintering time. During the sintering operation, the current rose from $30 \times 10^3$A to $39 \times 10^3$A.

The substrate was simultaneously bonded to a rectangular mild steel back plate prepared as in Comparison Example 1 and measuring approximately 64 mm × 44 mm × 2.5 mm thick.

The results are given in Table 1 below.

EXAMPLE 2

In a modification of Example 1, composition MB34 was used to form the substrate.

The results are given in Table 1 below.

EXAMPLE 3

Example 1 was repeated using composition MB34 as the substrate material and composition MB53 as the surface layer material.

The results are shown in Table 1 below.

In each of Examples 1 to 3, the substrate sintered satisfactorily, but with no sub-electrode 26 being present, it was found that the surface of the friction element in contact with the second electrode 16 remained essentially unsintered. This was attributed to the chill effect of the electrode, short sintering times and the formulation of the surface layer material. The effect was most noted with compositon MB53. However, most surface layer compositions were formulated to provide rapid initial bedding-in of the friction element in service whilst possessing friction properties similar to those of the substrate, and at the same time protecting the second electrode 16 from damage by brazing to the workpiece. Whilst in this example, dusting of the tip with fine graphite powder was effected to prevent sticking, it was found in practice that brazing of the material to the second electrode was not significant once a tenacious and substantial oxide layer had developed on the electrode tip.

EXAMPLE 4

In this Example, the apparatus illustrated in FIGS. 1 to 3 was employed but modified to include first and second electrodes 115 and 116 respectively shown in FIGS. 4 and 5 and 6 and 7.

Referring now to FIGS. 4 and 5, the first electrode 115 has a tip 117 at an end surface whose perimeter is recessed at 118 so as to define a land 119 which has an outline corresponding closely to that of the die cavity 13 so as to minimise variable heat loss to the back plate 9 which, it will be appreciated, can have a variety of shapes depending upon the brake assembly to which it is to be fitted. In this embodiment, the land 119 is arranged to overlap the die cavity by 3 mm. The outline of the die cavity is indicated by dotted line 13 in FIG. 4. The land 119 has a width of 5 mm and a height of 0.50 mm, the inner periphery of the land 119 being defined by an outer groove 120 having a width of 3 mm and a depth of 0.5 mm. The groove 120 is machined so as to be parallel with the land 119. The free end surface of the tip 117 is also provided with a central recess 121 having a diameter of 29 mm and a depth of 2.8 mm. As can be seen from FIG. 4, the central recess 121 breaks into the outer groove 120 at two mutually parallel side edges of the latter. Disposed within the central recess 121 is a disc 122 of silicon nitride having a diameter of 29 mm and a thickness of 2.8 mm except at its periphery where it is recessed so as to define between it and the wall of the recess 121 an inner annular groove 123 having an outer diameter of 29 mm an inner diameter of 23 mm and a depth of 0.5 mm. Such a construction defines a pair of inner lands 124 on opposite sides of the disc 122 and disposed between adjacent portions of the grooves 120 and 123. The surfaces of the lands 119 and 124 are machined so as to be smooth and planar.

Referring now to FIGS. 6 and 7, the second electrode 116 is plain with no insert and has a tip 125 formed of an alloy of 90% tungsten with iron, nickel and molybdenum as sold by Johnson Matthey as type M4000 and having a resistivity of 13 microohm.cm. The remainder of the second electrode tip 125a was formed of a copper/tungsten alloy sold by Johnson Matthey as type 10W3, having a resistivity of 5 microohm.cm.

In this embodiment, the second electrode 116 is intended to be used without sub-electrode 26. The arrangement of the first electrode 115 is such that the two inner lands 124 correspond to the desired current path flow through the type of material to be sintered.

Using the above described apparatus, the die cavity was sweep filled to a depth of 3 mm using composition MB53 The cavity was then sweep filled to a total depth of 13 mm with composition MB34 as substrate material.

The sintering operation was effected for a total time of 8.5 seconds whilst employing a first pressure of 800 p.s.i. (5520 KPa) for 6.5 seconds after which the pressure was increased to 1600 p.s.i (11040 KPa) for the remaining 2 seconds of the processing time. During such sintering, the current rose from $32 \times 10^3$A to $45 \times 10^3$A.

The resultant friction element had a surfce layer defined by the above mentioned composition which had been sweep filled into the cavity to a depth of 3 mm, such material being unsintered during the sintering operation which was effected so as to sinter the substrate material.

The results are shown in Table 1 below.

EXAMPLE 5

The Example 4 was repeated with no separate surface layer material but this time using 44.5 g of composition MB48. The sintering operation was effected at a first pressure of 800 p.s.i (5520 KPa) for 7.5 seconds after which the pressure was increased to 2000 p.s.i (13800 KPa) for 1.5 seconds, giving a total time of 9 seconds during which time the current rose from an approximate value of $30 \times 10^3$A to approximately $38 \times 10^3$A. The resultant material was found to be fully sintered except for a thin unsintered or partially sintered layer approximately 0.5 mm thick at the surface of the friction element adjacent to the second electrode 116.

Wear on thickness after testing was found to be 0.26 mm with a typical coefficient of friction of 0.35 during bedding. The total wear compared favourably with the apparent thickness of the unsintered layer as determined by hardness measurements. This was achieved by measuring surface hardness using the Rockwell H ($R^H$) scale after carefully grinding away measured increments of the thickness of the friction pad. The unsintered surface is characterised by an indeterminable low hardness and the transition zone by a gradually increasing hardness. The results are shown in accompanying FIG. 8. and in Table 1 below.

EXAMPLE 6

The Example 5 was repeated but this time using 45.8 g of composition MB52. Pressing was effected at 1000 p.s.i. (6,900 KPa) for 8.5 seconds after which pressure was increased to 2,400 p.s.i. (16560 KPa) for 2 seconds, giving a total time of 10.5 seconds during which time the current rose from approximately $38 \times 10^3$A to approximately $45 \times 10^3$A. It was found that the surface adjacent to the second electrode 116 had a thin unsintered or partially sintered surface layer less than 0.5 mm thick.

The results are given in Table 1 below. Due to a generally low hardness, it was not possible to determine the surface layer thickness as in Example 5 but the total wear appeared to correspond with the thinner regions of the layer. There was no significant change in the friction coefficient as testing proceeded, indicating that the frictional properties of unsintered and sintered material were similar.

In the above described Examples, the friction element was formed and brazed to the plate 9 at the same time. However, it is within the scope of the present invention to form the sintered friction element and bond it as a separate operation to the plate 9.

Also, it is within the scope of the present invention to form the sintered friction element using a furnace sintering operation as opposed to the resistance sintering operations described in the above Examples.

EXAMPLE 7

In a further Example, materials were pressed with a force of 0.12 MN in a cylindrical tool set 17.8 mm in diameter to form cylindrical compacts approximately 5 mm long. In one test representing the standard, the material consisted of 6 g of composition MB34. In a further test, 5.5 g of the composition MB34 was used as a substrate with 0.5 g of a composition 41 uniformly disposed to form a layer at one end of the compact.

Samples of each were placed on a backing member consisting of copper plated mild steel sheet aproximately 2.5 mm thick. In the case of the second Example, the substrate was placed against the backing member such that the 0.5 g of second material formed a thin layer at the free surface.

The assembled compacts were each subjected to a constant dead weight pressure of 0.15 MPa and sintered in a suitable furnace at 750° C. for 1 hour in an atmosphere of 90% nitrogen/10% hydrogen.

The compacts were found to be sintered to an approximate relative density of 81% and adequately bonded to the backing member. Metallographic examination showed the substrate material to be substantially sintered and the surface material only partially sintered. The substrate evidenced complete solution of the tin into the copper.

The results obtained are given in Table 1 below.

EXAMPLE 8

Using the apparatus of FIG. 1 to 3 without the sub-electrode 26 but with the first electrode 115 of FIGS. 4 and 5, the die cavity was first charged with 15 g of composition MB53 placed directly on the surface of the second electrode 16.

The remaining cavity was charged with approx. 40 g of composition MB42. Backplate 9 was placed so as to close the die cavity and a pressure of 8.19 MPa applied via the first electrode. Resistance sintering was carried out for 8.6s in the following sequence:
1. Heat for 1.8s—current rising to $26 \times 10^3$A.
2. Cool for 0.2s within tooling.
3. Heat for 4.5s—current rising to $46 \times 10^3$A.
4. Cool for 0.2s within tooling.
5. Heat for 1.9s—current rising to $49 \times 10^3$A.

During this process, the resistance of the workpiece fell from approx $1.7 \times 10^{-3}$ ohm to $12 \times 10^{-6}$ ohm. The final overall relative density was 82.4%, the thickness of the sintered material was 5.90 mm. Metallographic examination showed the surface layer to be substantially unsintered and approx. 2 mm thick. The combination of composition and chilling by the lower electrode were considered to be responsible for the low degree of sintering. The results obtained are shown in Table 1 below.

EXAMPLE 9

Using the apparatus employed in Example 8, the die cavity was first charged with approx. 17 g of composition MB58 as a surface layer material and then with approx. 34 g of composition MB42.

Sintering conditions:
Applied pressure—8.19 MPa (1188 psi)
Sintering time—8.1s
Sintering sequence—
1. Heat for 1.8s—current rising to $25 \times 10^3$A.
2. Cool for 0.2s within tooling.
3. Heat for 4s—current rising to $43 \times 10^3$A.
4. Cool for 0.2s within tooling.
5. Heat for 1.9s—current rising to $48 \times 10^3$A.

Initial resistance = $1.13 \times 10^{-3}$ ohm
Final resistance = $14 \times 10^{-6}$ ohm
Overall relative density of friction material = 79.1%
Total thickness of friction material = 5.58 mm.

Metallographic examination showed the surface layer to be approx. 1—2 mm thick and substantially unsintered in regions adjacent to the second electrode. The degree of sintering increased towards the indistinct interface between the surface layer and substrate. The results obtained are shown in Table 1 below.

COMPARISON EXAMPLE 2

This example was produced according to the method outlined in GB-A-No. 2106823 and is used to demonstrate the performance of a material having no bedding-in layer and not subjected to surface grinding. The performance also represents that expected of the substrates of Comparison Example 3 and of Examples 8, 9 and 10.

Using the apparatus employed in Example 8 but with a sub-electrode 26 formed of Fordath EC6, having a thickness of 4 mm and a resistance of $23 \times 10^{-6}$ ohm, the die cavity was filled with approx. 57 g composition MB42 on top of sub-electrode 26. No separate surface layer material was employed.

Applied pressure—6.83 MPa (991 psi)
Sintering time—9s
Current rising to $28 \times 10^3$A after 2s then increasing to a maximum of $34 \times 10^3$A after approx. 6.8s.
Initial resistance—$1.45 \times 10^{-3}$ ohm
Final resistance—$28 \times 10^{-6}$ ohm
Relative density—86.3%
Thickness—5.7 mm.

Metallorgraphic examination revealed the whole of the material to have a high degree of sintering with original particle boundaries indistinguishable or absent The results obtained are shown in Table 1 below.

COMPARISON EXAMPLE 3

Using the same apparatus as that used in Comparison Example 2, the die cavity was filled with about 4 g of composition MB35 as a surface layer material and then with approx. 50 g of composition MB42.

Sintering conditions:
Applied pressure = 6.8 MPa.
Sintering time = 8.6s.
Current rising to $25 \times 10^3$A after 2s and increasing to a maximum of $34 \times 10^3$A after approx. 6.5s.
Initial resistance—$2.09 \times 10^3$ ohm.
Final resistance—$30 \times 10^{-6}$ ohm.

The final product had an overall relative density of 83% and a thickness of 5.76 mm.

Metallographic examination showed this material to have developed a high degree of sintering despite the relatively low level of metal present. The high proportions of resistive materials (graphite and Fe) probably generated a high local temperature in the surface layer material causing a high degree of densification ($\Delta \rho$) allowing contact between metal particles. Surface layer thickness was approx. 0.5 mm. Other results are shown in Table 1 below.

EXAMPLE 10

Using the same apparatus as used in Comparison Example 2, the die cavity was filled with approx. 8 g of composition MB53 as a surface layer material and then with approx. 48 g of the composition MB42 as the substrate material.

Sintering conditions:
Applied pressure—6.83 MPa
Sintering time 8.6s
Current rising to $26 \times 10^3$A after 2s, increasing to a maximum of $32 \times 10^3$A after approx. 6.5s.

Initial resistance $1.9 \times 10^{-3}$ ohm.
Final resistance $30 \times 10^{-6}$ ohm The final product had an overall relative density of 84% and a thickness of 5.8 mm.

Metallographic examination showed the surface layer to have a thickness of approx. 0.5 mm and to be partially sintered compared to the similar material of Example 8. This was attributed to the extra stable heating effect of the substrate causing localised heating at the surface layer. Despite this difference it can be seen from Table 1 below that the frictional properties of Examples 8 and 10 were equal.

TABLE 1

| Example | Δρ % Sub. | Δρ % Sur. | Max Wear (μm) Sub. | Max Wear (μm) Sur. | Friction μ Max Sub. | Friction μ Max Sur. |
|---|---|---|---|---|---|---|
| C1 | 51 | 107 | 0.1 | 0.17 | 0.48 | 0.40 |
| 1 | 71 | 26 | 0.12 | 0.67 | 0.5 | 0.40 |
| 2 | 61 | 22 | 0.08 | 0.27 | 0.48 | 0.41 |
| 3 | 61 | 44 | 0.21 | 0.52 | 0.48 | 0.45 |
| 4 | 58 | 28 | 0.21 | 0.40 | 0.48 | 0.45 |
| 5 | 39 | 35 | <0.26 | 0.26 | 0.35 | 0.35 |
| 6 | 35 | 15 | <0.16 | 0.16 | 0.50 | 0.50 |
| 7 | — | — | 0.08 | 0.11 | 0.45 | 0.6 |
| 8 | 51 | 10 | *0.033 | 0.088 | 0.5 | 0.6 |
| 9 | 30 | 18 | *0.033 | 0.058 | 0.5 | 0.55 |
| C2 | 54 | 54 | 0.033 | 0.033 | 0.5 | — |
| C3 | 47 | 88 | *0.033 | 0.035 | 0.5 | 0.48 |
| 10 | 53 | 50 | *0.033 | 0.055 | 0.5 | 0.6 |

[In the above Table:
Sub. = substrate
Sur. = surface
C1, 1, 2, 3, 4 substrate wear was determined by grinding off the surface layer
C1, C2 and C3 are the Comparison Examples
*substrate wear determined an unground sample C2.
- indicates not measured.]

In Examples 8 to 10 and Comparison Examples 2 and 3, the following points were noted:

Example 8—greater than 50% of the area of the pad work hardened in contact with the brake disk, about 10% of the area was not contacted by the brake disc and the remainder pulled out after contact. The pad subjectively had a good "feel" from the first stop as assessed by the rider.

Example 9—about 40% of the area of the pad work hardened in contact with the disk. The pad subjectively had a good "feel" for the first stop, as assessed by the rider.

Comparison Example 2—not greater than 20% of the pad area contacted the disk. According to the rider, the pad had a hard "feel" and gave poor initial stop.

Comparison Example 3—about 15% of the pad area contacted the disk. According to the rider, the pad had a generally poor "feel".

Example 10—25 to 30% of the pad area contacted the disk. According to the rider, the pad had a generally good "feel".

In the above Examples the densification (Δρ%) was calculated according to the formula given earlier.

The initial density ($\rho_{initial}$) of the material subjected to resistance sintering is the density of the material under the pressure which exists at the initial sintering stage. However, it is not possible in general to measure such density by traditional methods because this initial density is low and hence the material has a very poor green strength Accordingly, the initial density at the relevant pressure for a material is read from a compressibility curve for that material wherein density is plotted against applied pressure In producing the compressibility curve for a particular material, 10 g of the material are charged into a silicon nitride die cavity of circular cross-section (25 mm diameter) onto a lower punch. The cavity is closed by an upper punch. Pressure is applied in stages with the force applied being measured by a load cell. The pressure is increased in stages and at each stage the distance moved by the punch is measured by a displacement transducer. The data obtained is then used to produce the compressibility curve for that material. Thus, in the case where two different materials are being resistance sintered, because the force is axially applied to both materials, the initial density of each can be separately assessed by reference to the respective compressiblity curves.

The final density ($\rho_{final}$) for each of the substrate and the surface layer is calculated by weighing a sample of the sintered product to give the combined weight of substrate and surface layer in the sample. The sample is then soaked in a 1% solution of a silicone-based hydrophobic material in benzene. After evaporation of the solvent, leaving a thin layer of the hydrophobic material on the sample so as to prevent absorption of water, the sample is suspended in water and weighed in water to determine the total volume. The softer surface material is then removed by grit blasting and the sample reweighed to give the weight of the substrate. After re-soaking in the solution of hydrophobic material, the sample is reweighed in water to determine the volume of the substrate. From the above, determination of the final densities of the substrate and the surface layer can be calculated.

The amount of adherent hydrophobic material is so small that its effect can be ignored in the calculations.

Whilst a comparison of the density and densification figures for substrate and the surface layer gives an indication of whether or not full sintereng of the surface layer has taken place, sintering can be assessed qualitatively by examination of the sample under a microscope. In FIG. 9, there is shown a typical unsintered sample where individual particles of metal (e.g. copper) are shown at 200 with minimal alloying in the case where an alloying ingredient is present. There is no or minimal contact between the particles 200. Non-metal alloying ingredients separate the metal particles 200 and are constituted by grains 210 of abrasive (e.g. alumina), coarse particles 220 of graphite and fine flake or plate-like particles 230 of mica or fine graphite. In FIG. 10, a partially sintered sample is shown. In this case, the metal particles 200 are in greater mutual contact as at 201 and sintered contact as at 202 occurs. If alloy elements are present, there is a more extensive alloying in the metal. In FIG. 11, a fully sintered structure is shown, the original metal particles being barely distinguishable and a metallic matrix 240 being readily apparent (alloying is not shown).

The metallic matrix binds the components 210, 220 and 230 into a coherent body and provides the base level of friction (adhesive). The lubricants and abrasives modify frictional behaviour with respect to operating conditions such as speed and temperature. They also help to maintain the desirable wear surface, friction disc surface morphologies. In addition to frictional performance, the various components have an effect on, sintereing behaviour. Both the content of metals and non-metals and their morphology determine whether the metallic matrix particles will sinter together during conventional furnace sintering.

It is not possible to formulate surface materials to give a low degree of sintering without also considering the manufacturing method and the required frictional performance. However, there are general principles which can be followed in order to suppress sintering of the surface layer:

(a) A relatively high level of unsinterable additives (non-metals) such as graphite and abrasives can be used. This is illustrated by MB12(a), MB35. In both, the high lubricant content (high graphite) relative to the low metal content is offset by a high abrasive content to maintain frictional performance. In MB35, there is a relatively high Fe/Cu ratio. Fe would be expected to provide a higher level of friction than Cu against a ferrous mating surface and therefore this should also offset lubrication.

(b) Particle morphology of the non-metals can be used to control sintering. Flake-like particles can interfere with interparticle metallic contacts and so some control can be derived from the addition of a plate-like mild abrasive such as mica (MB35, 41, 53) Changing particle size can also assist. For example, reducing the particle size of graphite increases the probability of graphite particles preventing interparticle contacts (MB35, 53, 58). The result of this simple change is illustrated by Example 9 where a change of graphite morphology only (MB42, MB58) has changed the degree of densification ($\Delta\beta$) from 30% to 18%.

(c) Reduction in the metallic content, and reduction of low melting point alloys can be used. When low melting point metals such as Sn, Zn, Al and Sn/Pb are present, they provide a liquid phase which greatly accelerates sintering. The effect of this liquid phase can be offset by either simply reducing its proportion compared to conventional levels (MB 12a, 35, 41, 53) or by increasing the content or dispersion of a non-wettable phase such as graphite (MB58). Reduction of the total metallic content (MB35) is strongly dependent on frictional requirements and might require compensation by replacing some of the metal content by a material of inherently higher friction e.g. increasing Fe/Cu ratio in MB35.

Three basic resistance sintering methods have been employed in the Examples:
(a) Surface layer formed by a separate composition with a sub-electrode.
(b) Surface layer formed by a separate composition without a sub-electrode.
(c) Surface layer and substrate formed of the same formulation without a sub-electrode.

(a) Since the sub-electrode provides a stable heating element throughout the sintering process, compositon requirements are related mainly to wear and frictional properties. However, the modifications made to suppress sintering will also increase at least the initial resistivity of the surface material and the thickness may be limited by the total resistance of the workpiece (backplate, powder and sub-electrode).

The presence of the sub-electrode ensures a high temperature at the friction face of the brake pad—this places more severe requirements on the composition of the surface layer to prevent full sintering. Comparison Examples 1 and 2 exhibit very high values of $\Delta\rho$. The surface layer of Example 10 has a $\Delta\rho$ nearly equivalent to the substrate material but as shown by Example 8, the surface material (MB53) is capable of exhibiting a low $\Delta\rho$ when no sub-electrode is present (10%).

(b) With no sub-electrode present, the chill effect of the lower electrode can be used to suppress sintering, alleviating some of the problems of compositions. However, the surface layer must assume the roles of the sub-electrode in providing a heating element and prevent adhesion brazing of the workpiece to the first electrode.

Brazing can be prevented by minimising the liquid phase content, particularly brazable metals such as Sn, Zn, Al or by suppressing wetting by the use of e.g. fine graphite (MB53 and MB58 respectively). MB41 (moderate liq. phase/coarse C) was prone to brazing. The resistive properties of the surface material depend on formulation but it is not possible to match the relatively stable resistance of the sub-electrode. Even a small degree of sintering can markedly reduce resistivity and it is normal to start with a surface layer whose thickness and resistivity produce a resistance higher than a sub-electrode but which reduces to a very much lower level during sintering. This reduction in resistance and hence heating effect can be compensated by increasing current However, high currents are difficult to control and may cause localised breakdown of resistance. A surface material of unduly high resistance due to thickness or a high inherent resistivity may limit the total current passed or lead to localised breakdown. The exact resistance requirements depend on the electrical characteristics of the resistance sintering power supply, however some typical results for resistance are given in TABLE 2 below. The higher currents required for no sub-electrode should be noted.

TABLE 2

| | TYPICAL RESISTANCES | | | | | |
|---|---|---|---|---|---|---|
| | INITIAL RESISTANCE $\mu\Omega$ | | | | FINAL RESISTANCE $\mu\Omega$ | |
| | | | | | Less | Max |
| Example | Substrate | Surface | Sub Electrode | Total | Sub-Electrode | Current KA |
| 8 | 640 | 1140 | — | 12 | — | 49 |
| 9 | 540 | 630 | — | 14 | — | 48 |
| C2 | 1170 | — | 23 | 28 | 5 | 34 |
| C3 | 1030 | 1035 | 23 | 30 | 7 | 35 |
| 10 | 980 | 900 | 23 | 30 | 7 | 32 |

(c) With no separately formulated surface layer the chill effect of the first electrode is largely responsible for producing an unsintered (partially sintered layer. The thickness of this layer is naturally difficult to control and is likely to vary throughout a section of the brake pad taken parallel to the surface thereof, although this is not necessarily disadvantageous. The material cannot be formulated to suppress sintering completely, since it must also form the sintered substrate, therefore the non-metal content must be controlled (i.e. fine graphite is undesirable) and the metal matrix should be of normal proportions (compare MB 52 and 48 with MB14, 34, 42 and 15.) To maintain some resistive heating during sintering and to prevent brazing to the first electrode, low melting point metals should also be minimised (MB52, 48). Again, since resistance will fall rapidly during sintering, the current requirement is generally higher than with a sub-electrode present as illustrated by examples 5 and 6.

During the short motor cycle bedding test used, the recorded wear rates were very low. However, as shown in Table 1, there is a strong correlation between the degree of sintering $\Delta\rho$ and total wear. Complete intimate contact between brake pads and friction disc was not achieved for any Example. However in terms of overall performance, Examples 8, 9 and 10 exhibited good characteristics from the first brake application with particularly good levels of friction. These examples were reported to have a "feel" as good as the resin-based materials (conventional) they could replace but with a softer, more acceptable "bite".

It was expected that with a particularly thick (about 2 mm) low strength surface layer, such as that of Example 8, the wear rate could remain unacceptably high until the surface layer is removed. However, the motor cycle tests have shown that under full scale conditions, bedding is characterized by the development of a suitable mating surface (wear surface), not necessarily by 100% contact area. This development prevents catastrophic wear. However, there is a good correlation between the rapid development of good performance characteristics and wear, and hence degree of sintering. Therefore, materials exhibiting a high initial wear as a result of a low degree of sintering would be expected to develop an acceptable frictional performance rapidly.

Comparison Examples 1 and 3 exhibit mutually similar characteristics. They have a degree of sintering considerably higher than typical substrates, wear rates equivalent to or little higher than substrates and, according to motorcycle testing of Comparison Example 3, poor bedding behaviour. Both were produced by using a sub-electrode and hence will have been subjected to a prolonged high temperature at the surface which may have prompted sintering. However Example 10 was also produced by using a sub-electrode and yet exhibited a degree of sintering no higher than the substrate and had acceptable bedding behaviour. This surface material (MB53) has higher total metal and low melting point metal contents than the surface materials of Comparison Examples 1 and 3 (MB12(a) and MB35) respectively. It should therefore exhibit a similar degree of sintering. However, MB35 and MB12(a) have relatively high levels of Fe or Ni relative to their Cu contents (cf MB41). Fe and Ni have resistivities considerably higher than Cu:

Cu—$1.7 \times 10^{-8}$ ohm.m
Ni—$59 \times 10^{-8}$ ohm.m
Fe—$10 \times 10^{-8}$ ohm.m They also have very high graphite contents compared to the other materials used for surface layers. These large proportions of resistive materials have probably provided a stable resistance during sintering causing the generation of heat within the surface layer with consequent sintering.

Examples 8 and 10 differ only in the absence of a sub-electrode in Example 8. The heating effect of the sub-electrode has clearly produced a higher degree of sintering ($\Delta\rho$) in the surface of the sample of Example 10 (confirmed by metallographic examination). However, the frictional performance in terms of u and "feel" were equivalent.

In Example 7, which was produced by furnace sintering, the relative wear values (Table 1) suggest that the wear of the surface layer was only a little higher than that of the substrate. However, metallographic-examination indicated that the surface material was only partially sintered relative to the substrate. The surface exhibited a coefficient of friction higher than the substrate and therefore fulfils the requirements of performance discussed previously.

In the above Examples 1 to 10 of the invention, the unsintered or partly sintered surface layer material extended over the whole of the friction surface of the brake pad i.e. the surface of the pad which contacts the brake disc in use.

I claim:

1. A friction element comprising a sintered substrate formed of metallic friction material containing sintered metal particles and at least one friction modifier; and a surface layer having a thickness of up to about 2 mm on said sintered substrate and defining a friction surface of the friction element; said surface layer being formed of a metallic friction material containing at least one friction modifier and metal particles which are unsintered or sintered over substantially the whole of said friction surface to a lesser extent than said friction material of said sintered substrate so that said surface layer has less wear resistance than said sintered substrate and friction properties which are not substantially less than those of said sintered substrate.

2. A friction element as claimed in claim 1, wherein said surface layer is an unsintered or partly sintered portion of the same metallic friction material which forms said sintered substrate.

3. A friction element as claimed in claim 1, wherein said surface layer is formed of a different metallic friction material which is unsinterable or less easy to sinter than that of the substrate under the sintering conditions.

4. A friction element as claimed in claim 1, wherein the surface layer has a thickness of about 0.5 to 2 mm.

5. A method of manufacturing a friction element comprising the steps of disposing in a resistance sintering die (1) at least one layer of powdered metallic friction material which (a) contains sinterable metallic particles and at least one friction modifier and (b) is destined to form a sintered friction material substrate of the friction element and (2) a surface layer of powdered metallic friction material which (a) contains metallic particles and at least one friction modifier and (b) is destined to form a friction material surface layer of the friction element; and subjecting said layers of powdered metallic friction material to a resistance sintering operation at a pressure and temperature such as to sinter said sinterable metallic particles of said at least one layer of powdered metallic friction material whereby said sintered substrate and said surface layer of the friction element having a thickness of up to 2 mm are produced, wherein said surface layer of powdered metallic friction material which is destined to form said surface layer of the friction element is formulated so as to be unsinterable or only partially sintered under said pressure and temperature whereby said surface layer of the friction element has less wear resistance than said sintered substrate and frictional properties which are not substantially less than those of said sintered substrate.

6. A method as claimed in claim 5, whrein the resistance sintering operation is effected using a metal electrode in direct contact with said surface layer of powdered metallic friction material.

7. A method as claimed in claim 6, wherein said metal electrode has a surface in contact with said surface layer of powdered metallic friction material, said surface of said metal electrical being defined completely by the metal of the electrode.

8. A method as claimed in claim 6, wherein said metal electrode has a surface in contact with the surface layer of powdered metallic friction material, said surface of said metal electrode being defined partly by an insert having a higher resistivity than the metal of said metal electrode.

9. A method as claimed in claim 5, wherein the sintering operation is effected using a sub electrode and a metal electrode, the sub electrode having a lower thermal conductivity than the metal electrode and being in contact with said surface layer of powdered friction material, and wherein the surface layer is different from the substrate material.

10. A method of manufacturing a friction element comprising the steps of disposing in a resistance sintering die a layer of powdered metallic friction material which (a) contains sinterable metallic particles and at least one friction modifier and (b) is destined to form a sintered friction material substrate and a friction material surface layer of the friction element; and subjecting said layer of powdered friction material to a resistance sintering operation at a temperature and pressure such as to sinter a portion of said layer destined to form said substrate, wherein said resistance sintering operation is effected using a metal electrode in contact with a portion of said powdered metallic friction material destined to form said surface layer whereby a chill effect is produced so that a said portion of said powdered metallic friction material which is in contrast with said metal electrode remains unaltered or is only partially sintered so that said surface layer is produced which has a thickness of up to 2 mm, less wear resistance than said substrate and friction properties which are not substantially less than those of said substrate.

11. A method of manufacturing a friction element comprising the steps of shaping a plurality of powdered metallic friction materials to produce a preform having a substrate portion and a surface portion which is (a) destined to form a surface layer portion of the friction element and (b) defined by one of said powdered metallic friction materials; and subjecting said preform to a furnace sintering operation so as to sinter the powdered metallic friction material which is destined to form said substrate; wherein said one of said powdered metallic friction materials which define said surface layer portion of the friction element is selected so that it remains unsintered or is only partially sintered during the furnace sintering step whereby said surface layer portion of the friction element has less wear resistance than said substrate and has friction properties which are not substantially less than those of said substrate.

* * * * *